April 1, 1952 R. H. LESTER ET AL 2,591,561
APPARATUS FOR PRODUCING REFRACTORY RODS
Filed April 28, 1943 5 Sheets-Sheet 1
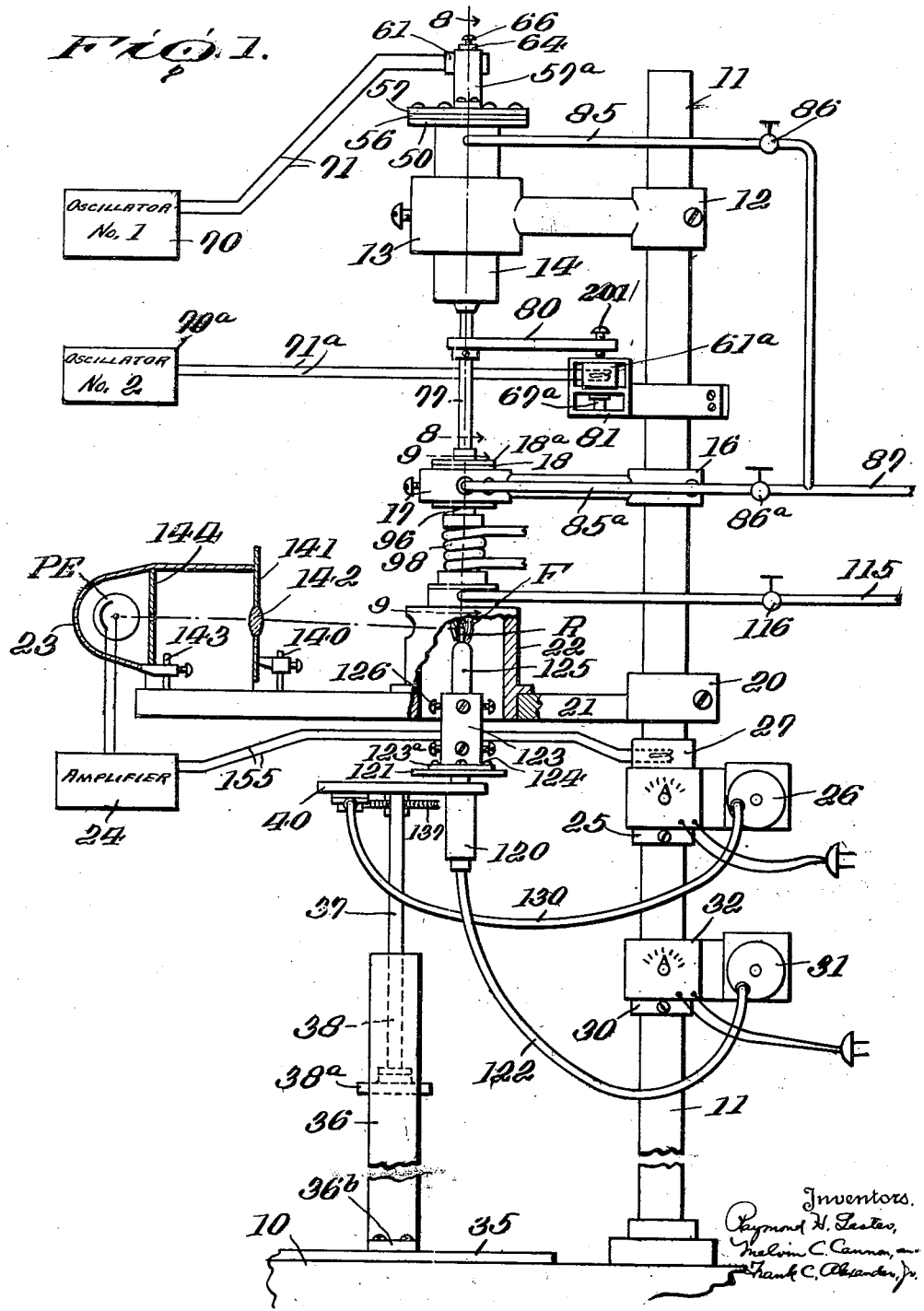

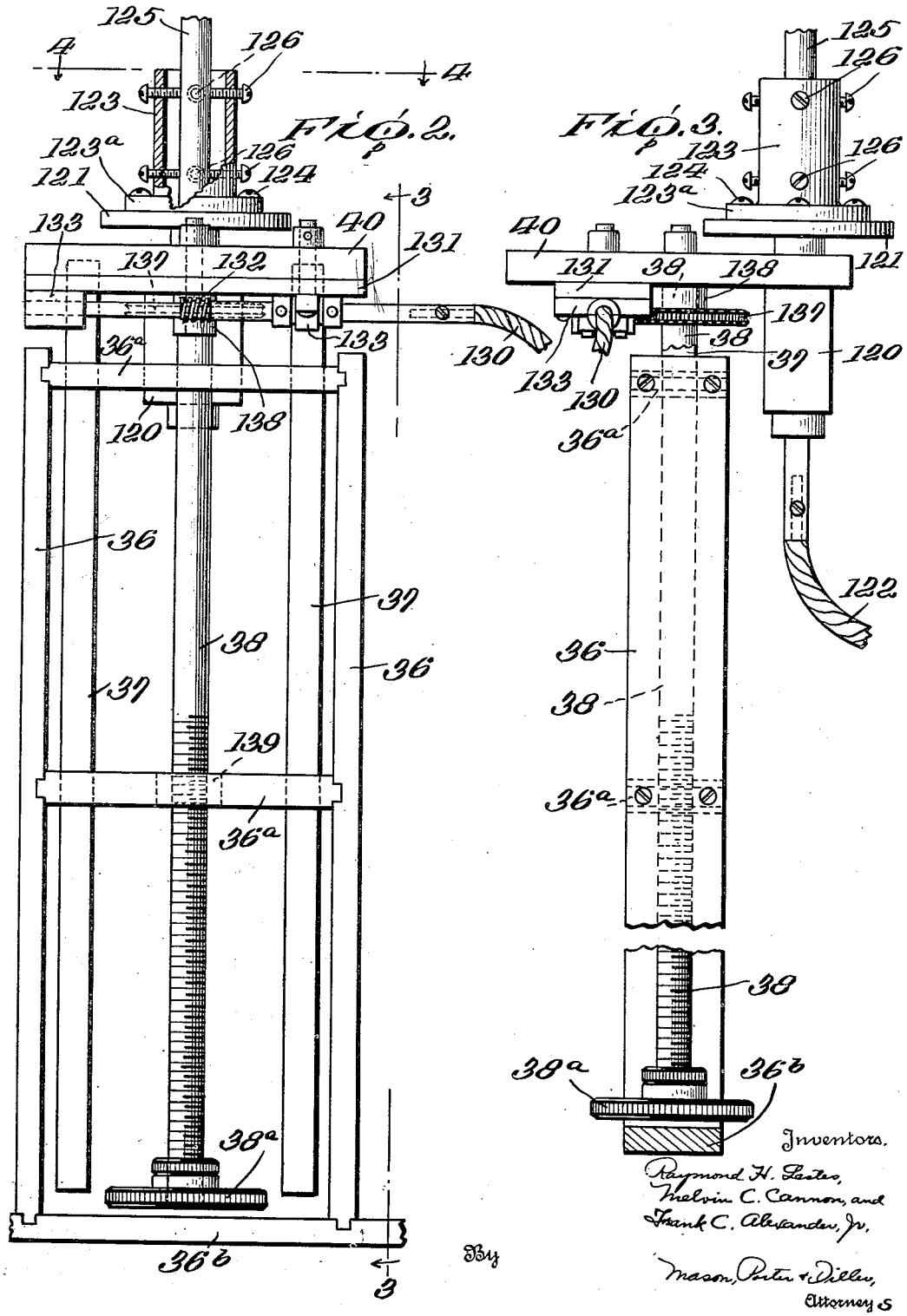

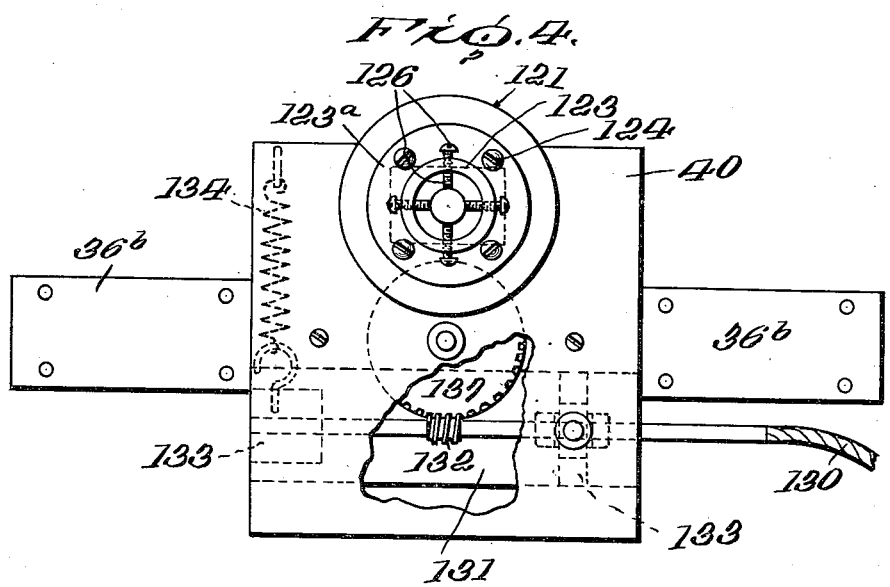
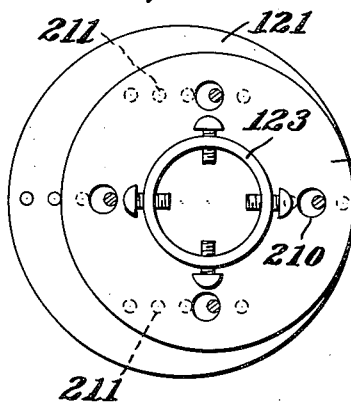
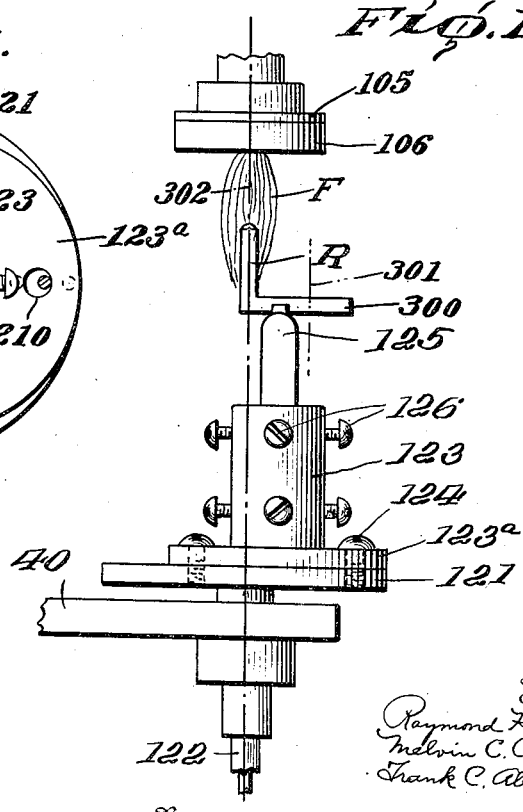

April 1, 1952  R. H. LESTER ET AL  2,591,561
APPARATUS FOR PRODUCING REFRACTORY RODS
Filed April 28, 1943  5 Sheets-Sheet 4
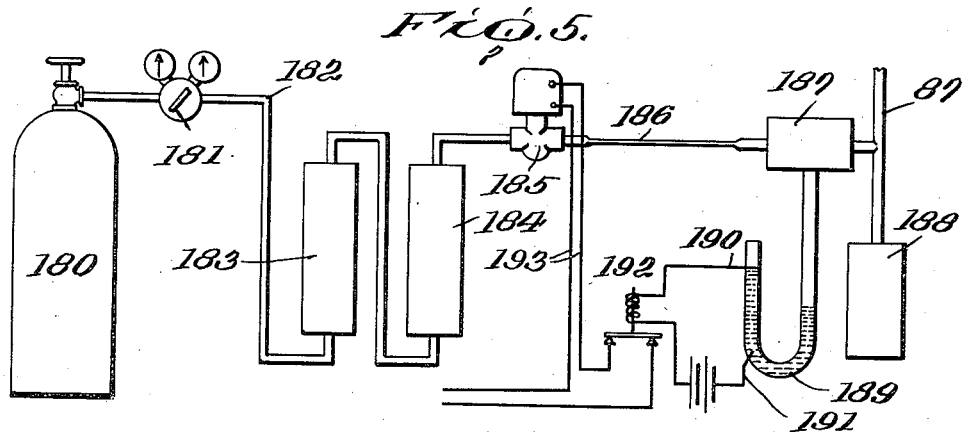
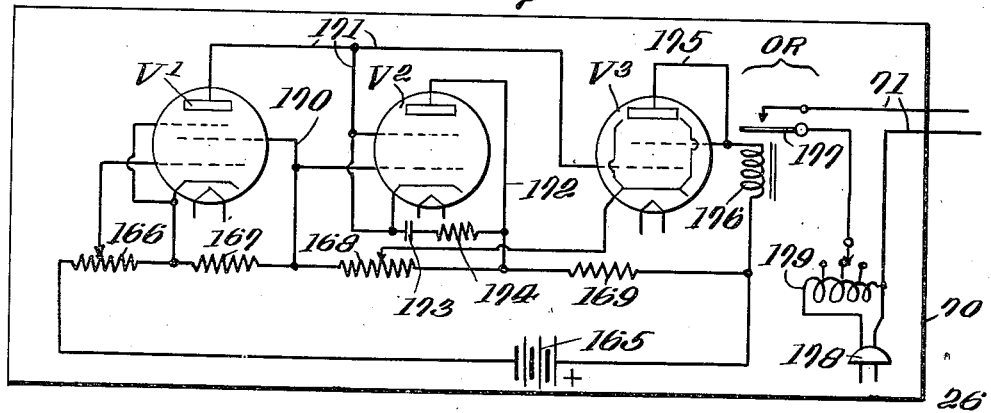
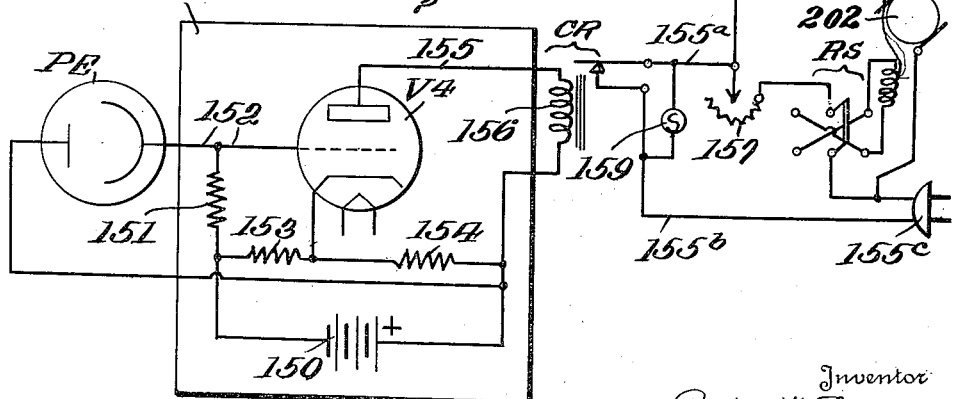
Inventor
Raymond H. Lester,
Melvin C. Cannon,
Frank C. Alexander, Jr.,
By
Mason, Porter & Diller,
Attorneys April 1, 1952  R. H. LESTER ET AL  2,591,561
APPARATUS FOR PRODUCING REFRACTORY RODS
Filed April 28, 1943  5 Sheets-Sheet 5
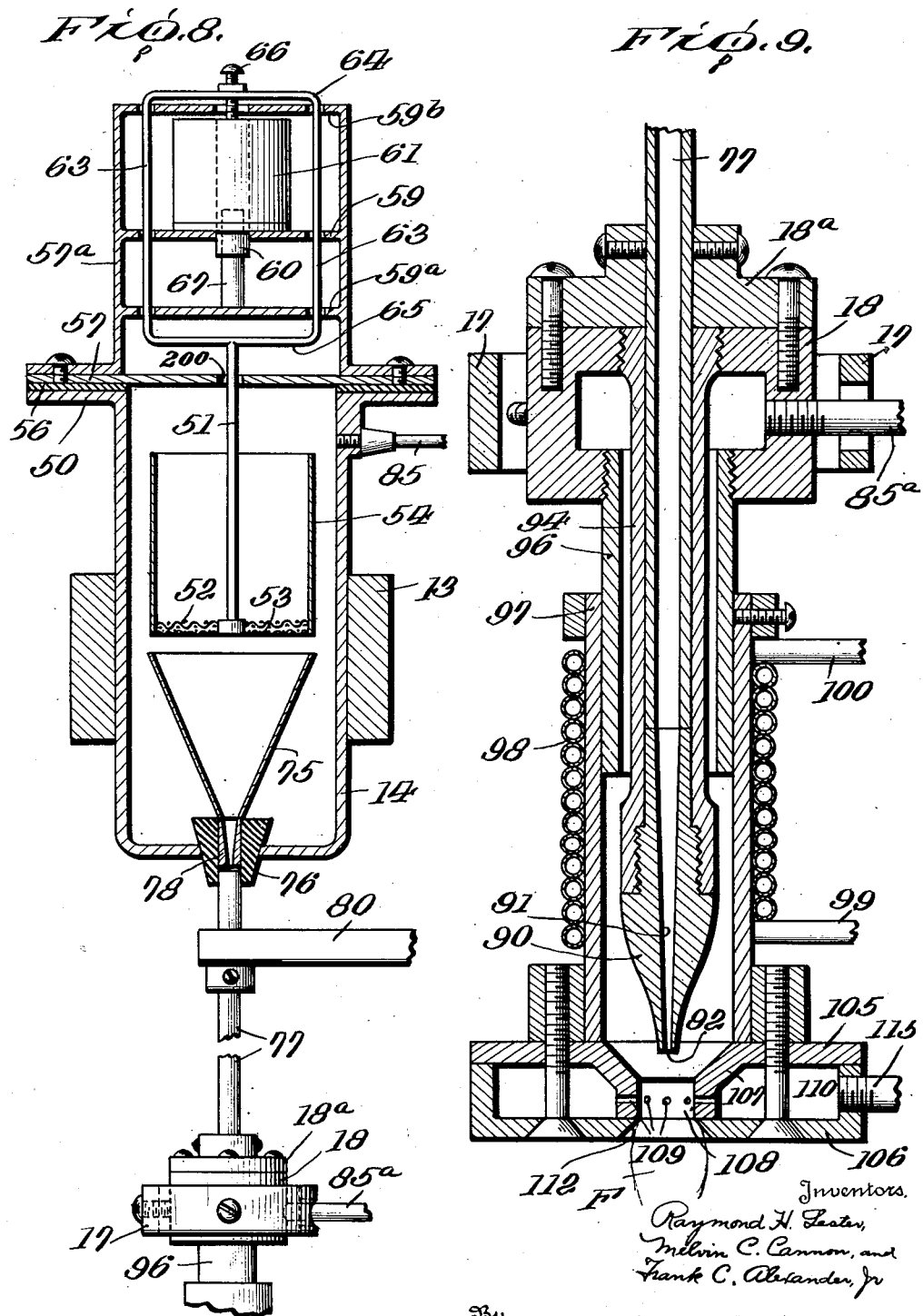

Patented Apr. 1, 1952

2,591,561

UNITED STATES PATENT OFFICE 2,591,561

APPARATUS FOR PRODUCING REFRACTORY RODS

Raymond Holmes Lester, Melvin Croxall Cannon, and Frank Creighton Alexander, Jr., Pittsburgh, Pa., assignors to Elgin National Watch Company, Elgin, Ill., a corporation of Illinois Application April 28, 1943, Serial No. 484,946

8 Claims. (Cl. 49—53)

This invention relates to the art of making crystalline rods of sapphire, spinel and like high-melting materials; and is more particularly concerned with the apparatus.

It is already known to prepare bodies of melted and resolidified alumina, usually containing traces of other oxides as coloring matter, for the production of synthetic gems. For this purpose, the alumina mixture is introduced into the inner tube of a high temperature blow torch, and the fused droplets are collected on a refractory support and built up to form a boule. Such boules are of relatively large diameter, being from 7 to 25 millimeters or larger, and the mechanisms are allowed to operate with manual supervision during the process of "growing."

When it is sought to prepare sapphire, ruby and spinel rods for the making of jewels for the bearings of watches and like fine instruments, the rods may be smaller in diameter, and can be grown at a greater linear rate. Further, in order to manufacture, from such rods, jewel bearings of satisfactory quality, it is desirable that the rods each consist of a single crystal with the crystal axes definitely oriented.

One of the features of the present invention is the provision of an apparatus by which the growth of the rod is automatically maintained at a predetermined level or rate.

Another feature of the invention is the provision of a feeding mechanism by which very fine powder may be employed, with a consequent improvement in the qualities of the rods.

A further feature of the invention is the provision of a torch design by which fine powders may be employed without clogging, and which is of simple construction.

Still another feature of the invention is the provision of means for tapping or agitating the powder feeding system at a conveniently variable frequency.

A further feature of the invention is a means of obtaining, with anisotropic crystals, a crystal of any desired orientation from a crystal of known orientation.

A still further feature of the invention is a manner of controlling the growing habit of isotropic crystals.

A further feature of the invention is the production of small crystalline rods of sapphire, ruby, spinel and other high melting substances having an alumina base.

With these and other features as objects in view, an illustrative manner of practicing the invention is set out in the following description, in association with reference to the accompanying drawings, in which:

Figure 1 is a general elevation view illustrating an apparatus employed, with parts broken away.

Figure 2 is a front elevation view, on an enlarged scale, of the structure for supporting and moving the rod, with parts broken away.

Figure 3 is a view, substantially on line 3—3 of Fig. 2, with parts broken away.

Figure 4 is a plan view, partly in section, substantially on line 4—4 of Fig. 2.

Figure 5 is a diagram showing a regulating and control system for gas to be employed in the blow torch.

Figure 6 is a circuit diagram of an energizing oscillator for the tapping devices.

Figure 7 is a diagram of a control mechanism for regulating the rate of movement of the rod during its growth.

Figure 8 is a sectional view on an enlarged scale, substantially on line 8—8 of Fig. 1, showing the powder feeding assemblies.

Figure 9 is a sectional view of the torch assembly, on a somewhat larger scale than Fig. 8, and substantially on line 9—9 of Fig. 1.

Figure 10 is a view corresponding to a part of Fig. 2, showing a manner of predetermining the orientation of crystal axes of the rod being grown.

Figure 11 is a top view of a turntable, with illustration of a manner of adjusting a holder base relative to the axis of the turntable.

In these drawings, an apparatus is shown as having a base structure or plate 10 upon which is mounted a vertical column 11 for supporting the several structures as described hereinafter.

An upper clamp bracket 12 has an arm 13 for supporting the body housing 14 of the powder supplying mechanism. A second clamp bracket 16 has an arm 17 provided with a ring and screws for supporting and aligning the upper manifold body 18 of the torch assembly. A third clamp bracket 20 has an arm 21 for supporting a refractory heat-insulating furnace member 22; and also serves for supporting a photoelectric control device, as described hereinafter, and including a housing 23 containing a photoelectric cell PE. A further clamp bracket 25 supports a motor and reduction-gearing assembly 26 which is employed for causing the lowering of the rod as it is formed. A reduction ratio of 40:1 has been employed in the motor gear box together with a 100:1 worm and wheel reduction as described hereinafter. This bracket 25 also supports means within a control housing 27 for controlling the operation of the motor 26. A clamp bracket 30 supports a motor and gearing assembly 31 for determining the rotation of the rod during its formation; and this bracket 30 also supports a housing 32 containing means for controlling the operation of the motor 31.

A base 35 is movable in various horizontal directions upon the general base 10, but is stationary during operation in a position whereby the rod R is concentric with the burner. The standards 36 are fixedly connected through a base piece 36b with the base 35, and provide guides for the rods 37 and the spindle 38 which are connected at their tops to the platform 40. When the spindle 38 is turned relative to the standards 36, the platform 40 is caused to rise or fall, being held against rotation about the axis of the spindle 38 by the guide rods 37.

The mechanism for feeding powder is illustrated in section in Fig. 8. The general body housing 14 is closed at its upper end except for a small hole 200 through which slidably projects a rod 51. The lower end of this rod is secured to the center of two circular screens 52, 53. The upper screen 52 is preferably relatively coarse, and a 60-mesh screen has been found desirable. The lower screen 53 is of much finer mesh, and it has been found that screens of 325 to 400 mesh are effective. The peripheries of these screens are fixed, as by soldering, to the bottom of a cylindrical can 54, so that the weight of the can, screens and the contents are supported by the rod 51.

Above the top flange 50 of the main body 14 is a sealing gasket 56 upon which is a closing plate 57. To this closing plate is fixed an upper structure 57a which has the transverse webs or bridges 59, 59a and 59b which are apertured to receive and guide in vertical movement the legs 63 of an oscillatory yoke having a top cross-bar 64 and a lower cross-bar 65 which is fixedly connected to the rod 51. The web 59 supports the guide sleeve 60 of a solenoid 61.

A vibrating hammer is provided by a plunger 67 which acts as an armature or movable core piece for the solenoid 61 and is attracted upwardly when the solenoid is energized, and thereby impacts upon the adjustable screw 66 on the yoke cross-bar 64 and delivers a hammer blow thereto, which causes the rod 51 to be tapped suddenly and abruptly in an upward direction, against the gravitational action upon the can 54 and its contents, so that a delivery of powder occurs from the can, through the screens 52, 53 at its bottom. Therefore, when the energization of the solenoid 61 is identical for successive operations, identical efforts are being delivered to the screens 52, 53, and substantially similar quantities of material can be supplied therethrough. When the solenoid is de-energized, the plunger 67 falls down to its position of rest upon the web 59a. The yoke descends after being tapped, and comes to rest with its upper cross-bar 64 engaging the web 59b which latter acts as a stop to limit the downward movement of the yoke.

The solenoid 61 is energized through a source of electricity and a control means by which impulses of current are delivered through conductors 71 to the solenoid 61 at a definite but adjustable rate. For this purpose, it has been found that a relaxation oscillator with associated devices is an excellent controlling and metering device. Such a structure 70 is described in detail hereinafter.

The main body 14 of the feeding device is hollow for receiving the can 54, and for supporting a funnel 75 for catching the powder which passes the screens 52, 53. This funnel is seated in a resilient cushioning stopper 76 located in an aperture in the bottom of the housing 14. Likewise received in the stopper 76 is the upper end of a conveying duct 77 having a bore which preferably is larger than the bottom orifice 78 of the funnel 75: it is preferred to connect the duct 77 fixedly to the funnel 75, as by soldering.

This duct 77 supports a lateral arm 80. A second tapping device 81 is supported on the column 11 and has a solenoid 61a energized by a source 70a through conductors 71a. The solenoid when energized causes the upward movement of the plunger or hammer 67a which strikes an adjustable screw 201 on the arm 80. The duct 77 leads into and is illustrated as forming part of the blow torch or burner assembly.

The chamber in body 14 is connected by a conduit 85 through the regulating needle valve 86 with the oxygen supply main 87 (Figs. 1 and 5). The body 18 provides an annular chamber connected by a conduit 85a through a regulating valve 86a with the oxygen supply main 87.

The duct 77 is shown (Fig. 9) as leading to a nozzle tip 90 having an external enlargement adjacent its lower end and providing a primary jet nozzle or inner tip for delivering primary oxygen and the powdery alumina. Internally, the nozzle 90 has a convergent taper 91 leading from the internal diameter of the duct 77 to the jet orifice 92 which may have a diameter of about 0.040 to 0.070 inches. Surrounding and reinforcing the duct 77 and supporting the nozzle 90 is a sleeve 94 which is threaded at its lower end to receive the tip 90, and is threaded at its upper end into an aperture in the upper wall of the main manifold body 18. The secured flange 18a on body 18 is clamped to the duct 77.

Surrounding the sleeve 94 is an outer sleeve 96, which is threadedly supported in the body 18. A jacket 97 is closely but slidably fitted, at its upper end, to the sleeve 96 and forms an extension of the annular passage about the sleeve 94. The jacket 97 is surrounded by a coiled pipe 98 having the inlet and outlet connections 99, 100 by which water may be employed for keeping the torch cool.

A lower manifold is provided by a plate 105 fixedly secured to the jacket 97, and by a closing member 106 which is sealed to the plate 105. Centrally of the plate 105 is a convergent conical member 107 leading to the throat 108. This throat 108 is a cylindrical structure having a number of openings 109 communicating between the manifold chamber 110 and the throat 108. For an oxyhydrogen torch, the openings 109 can be eight in number and have a diameter of 0.040 inch. It is preferred to have the closing member 106 provided with a divergent surface 112 below the throat 108, so that the surfaces of the conical member 107, of the cylindrical throat portion 108 and of the closing member 106 provide a modified venturi at which mixture of combustible gas (such as hydrogen) and oxygen can be accomplished with a downward delivery of the flame F.

A hydrogen supply pipe 115 is connected through the valve 116 with the manifold chamber 110.

The platform 40 supports a bearing 120 in which is mounted a turn-table 121. This turn-table is connected by a flexible shaft 122 with the motor 31.

The upper surface of the turn-table 121 supports a holder 123 having a base 123a which can be varied in position over the area of the turntable and can be secured in a definite position by screws 124. In Figure 11 the turntable 121 has the base 123a resting thereon.

This base has large holes 210 for receiving the screws 124, the stems of these screws being smaller than the apertures. The threaded holes 211 in the turntable 121 are provided for selectively receiving the screws 124, to permit the variation of position of the holder 123 and its base 123a, and the securing in such adjusted position. In the form of this holder illustrated in Figs. 1, 2 and 3, its upper portion 123 is hollow, for receiving a ceramic support 125 upon which the rod is to be grown. Two sets of adjusting screws 126 are located at different levels of the holder 123 to engage the ceramic support, and are effective for positioning the upper end of the support 125 accurately at the axis of the turntable 121.

As shown in Figs. 1 to 4, the lowering mechanism includes a flexible shaft 130 extending from the motor 26. Beneath the platform 40 is a pivoted clutch plate 131 upon which are the bearings 133 for a worm shaft having a worm 132. The worm shaft projects outwardly and is connected to the flexible shaft 130. The clutch plate 131 is pulled by a spring 134 so that the worm 132 is normally held in engagement with the worm wheel 137 which is fixed on the spindle 38.

In a presently employed device the worm-worm wheel speed reduction is 100:1. The upper end of the spindle 38 is supported for rotation in a bearing 138 on the platform 40. The cross-arms 36a of the standards 36 are apertured for receiving and guiding the rods 37. A nut 139 for the spindle 38 is carried by one cross-arm 36a, so that rotation of the spindle about its axis causes the platform 40 to rise or fall. A hand wheel 38a on the spindle may be used for rotating it when the clutch plate 131 has been rocked to disengage the worm 132 from the worm wheel 137.

The arm 21 is illustrated in Fig. 1 as having a support 140 for a lens board 141 having a lens 142 thereon, the assembly being constructed and arranged to permit adjustment of the lens so that the image of the upper end of the growing rod R may be projected toward the housing 23 of the photoelectric cell PE, this housing itself being likewise supported on an adjustable member 143 so that an apertured screen 144 may be brought accurately to position for receiving the image of the end R when this end is at a desired level. Thus the cell PE is a device to scan the position of the growing end of the rod R.

Fig. 7 illustrates a circuit which can be employed with the photoelectric cell PE, which has its electrodes connected to a source of current 150 through a high-value resistor 151 (for example, 60 megohms). This cell PE is part of a control and operates through an amplifying apparatus conventionally shown in Figure 1 by the box 24. The conductor 152 from the photocell cathode is connected to one end of this resistor 151 and also to the control grid of the electron discharge tube V4, which may be of 6J6 type. The cathode of the tube V4 is connected through a resistor 153 (e. g. 1000 ohms) with the negative terminal of the battery 150 (e. g. 150 volts) and this cathode is also connected through the resistor 154 (e. g. 10,000 ohms) with the positive terminal of the battery 150. The anode of the tube V4 is connected by the conductor 155 through the coil 156 of a control relay CR which, when energized, closes a circuit through the conductors 155a, 155b leading from a source of current illustrated as a connector 155c. Conductor 155a is branched with one portion leading to and through the armature 202 of the motor 26, and another portion leading through the field rheostat 157 and a reversing switch RS and through the field 203 of the motor 26. A manually operable switch 159 permits short-circuiting the automatic control system.

In operation, as the illumination of the cell ceases, as when the rod end R has been lowered too far, the current flow in the cell PE essentially ceases and the upper end of the resistor 151 becomes relatively more negative and controls the grid of the amplifying electron discharge tube V4 so that current flow through this tube essentially ceases, and therewith current no longer flows through the coil 156 of the control relay CR; so that the contacts of this relay open and the flow of current through the motor 26 terminates and this motor comes to a standstill. As the rod continues to build up within the furnace 22, the end R ultimately comes to a position where its image is again cast upon the photoelectric cell PE. Current then flows through this cell and the upper end of the resistor 151 becomes relatively more positive, the amplifying tube V4 passes current and the control relay CR closes and effects energization of the motor 26, so that the platform 40 and the rod support 125 are moved downwardly again.

By selection of the motor speed and gear ratios, the spindle 38 can be driven by continuous operation of the motor at a rate in excess of the production of the rod. In order to have the rate of movement of the rod as nearly constant as possible, the field rheostat 157, located in control housing 27, is initially adjusted for causing the rod to be lowered at slightly greater than the desired rate of growth, which has been found to be between one inch and two inches per hour in apparatus presently employed.

During the initial operations of starting a rod, it is desirable to operate manually and without control through the photoelectric cell PE, and for this purpose the connector 155c may be pulled from its receptacle; and by re-plugging the connector 155c, the automatic control is put in operation. The clutch 131 is disengaged for manual operation.

The relaxation oscillators for operating the solenoid windings 61, 61a of the tappers are set out, in Fig. 6, as including a first electron discharge tube V1 for maintaining a constant current supply and illustrated as a sharp cut-off pentode tube of the 6SJ7 type; a second electron tube V2 which is shown as a gas discharge or thyratron tube of the 2050 type having a screen grid as well as a control grid, and a third electron discharge tube V3 which is a power output tube and may be a beam-power output tube of the 6V6 type.

These tubes are shown in resistance coupling across a source 165. Resistors are connected in series across this source and include a potentiometer 166, which has its variable mid-terminal connected to the control grid of the tube V1; a resistance 167 which determines the space charge between the cathode and the screen grid of the tube V1; a potentiometer 168 which has its mid-terminal connected to the cathode and beam-directing electrodes of the beam-power output tube V3; and a resistor 169 which controls the cathode-anode potential drop in the output tube V3. The cathode of the tube V1 is connected to the suppressor grid thereof. The screen grid of the tube V1 is connected by conductor 170 to the control grid of the discharge tube V2 and also to the common terminal of the resistances 167, 168.

The anode of the tube V1 is connected by a branched conductor 171 to the screen grid and cathode of tube V2, and also to the control grid of the output tube V3. The anode of the tube V2 is connected by conductor 172 to the common terminal of the resistances 168, 169. The condenser 173 and the resistor 174 are connected in series between the cathode of the tube V2 and its anode.

The anode of the output tube V3 is connected by a conductor 175 with a coil 176 of a relay OR and thus to the positive terminal source 165. When the relay coil 176 is de-energized, the contacts 177 are closed so that current is supplied through conductors 71 to the solenoid 61 from a separate source which is indicated as separable connector 178 for connection to a power line. It is preferred to include a current controlling device such as the adjustable auto-transformer 179.

In operation, at a prevailing setting of the potentiometers 166 and 168, the current flowing through the tube V1 is effective for building up a charge in condenser 173 at a rate determined by the external resistance 174 and the permitted-current flow characteristic of the tube V1. The voltage across condenser 173 increases until the grid of V3 becomes sufficiently negative to cause the plate current of V3, flowing through relay coil 176, to drop so that the relay armature is released and the back-contacts 177 close, energizing the solenoid 61. Ultimately the voltage across condenser 173 increases until it establishes a plate-cathode potential, across the tube V2, which is effective in provoking current flow through this tube at an essentially fixed rate, and the condenser 173 discharges through this tube V2. When the voltage on condenser 173 reaches a sufficiently low value, the conductor 171 connecting the condenser 173 and the control grid of the tube V3 causes the grid-cathode potential of the tube V3 to become so much lower that the plate current of the tube V3 flowing through the relay coil 176 increases until the armature of the relay is attracted to the core, therewith opening the back-contacts 177 and de-energizing the solenoid 61. The control grid of the arc discharge tube V2 does not affect the magnitude of the discharge current, but controls the plate-cathode potential at which the tube V2 may fire. The condenser 173 continues to discharge through the tube V2, at a rate determined by the characteristic of this tube and the size of the resistance 174: when this current reaches a definite low value, it no longer maintains the flow path through the tube V2, and this tube again comes under the control of its grids, and this current flow ceases. Thereupon, the condenser 173 begins to charge again, and the action is repeated.

Using the illustrated tubes, and having the potentiometer 166 of 500 ohms, the resistance 167 of 5,000 ohms, the potentiometer 168 of 20,000 ohms, the resistance 169 of 25,000 ohms, the resistance 174 of 2,500 ohms, with a condenser 173 of 0.5 microfarads and 350 volts at the source 165, it is feasible to obtain frequencies of 1.8 to 6,000 cycles per minute through variation of the resistor 166. Further, variation of the potentiometer 168 controls the grid bias of the tube V3, and permits adjustment for the time duration of current flow in this tube. Thus, the duration of the time, during which the solenoid 61 is energized and the plunger 67 is effective as a hammer, may be controlled by varying resistor 168. It is desired for the tapping solenoid to have low inductance so that a sharp impact is delivered. The relay inductance is not critical, as the relay need only be capable of operating from the plate current of V3. The relay is energized during the course of the discharge and released during the course of the charging. The variable auto-transformer 179 permits regulation of the hammer blow of the plunger 67 in accordance with the powder employed. Thus, the rate of supplying powder to the torch flame may be regulated both by the power of the individual tapping blows and by the number of blows per minute.

A second and similar relaxation oscillator 70a is employed for energizing conductors 71a leading to the solenoid 61a of the second tapping device 81 which is illustrated as similar to that of the first tapping device, except that the plunger is arranged to strike a screw on the arm 80, and the frame is supported by the upright column 11; and thereby vertical and rocking movements are communicated to the duct 77 and its associated parts.

For accurate and regular production of rods, it is necessary that the pressure of gas in the supply for the torch system should be constant. In Fig. 5 is illustrated an apparatus for maintaining constancy of the gases, illustratively showing the connection for the oxygen supply. In this figure, the oxygen cylinder 180 delivers the gas through the usual regulator valve and pressure indicator assembly 181, from which it moves by a conduit 182 through the calcium chloride drying chamber 183, and thence through a filter chamber 184 containing cotton. From this, the gas passes to a solenoid-actuated valve 185, and thence through a constricted tube 186 to chamber 187, from which it moves into the conduit 87 which has a storage and balancing chamber 188 connected thereto. A mercury manometer tube 189 is connected to the chamber 187 and is provided with electrodes 190, 191 which close a control circuit at a predetermined maximum pressure in the chamber 187, and thereby energize a relay 192 which opens the circuit through conductors 193 leading to the solenoid valve 185 for closing this valve, so that the delivery of gas to the restricted conduit section 186 ceases.

The gauge pressure supplied to the hydrogen control valve 116 has been around 11 inches of mercury; and that to the oxygen valves 86, 86a around 9 inches: the absolute pressures which can be employed will vary with the apparatus and are not critical, but constancy of the pressures is essential. In operation it has been found desirable to maintain the gauge pressures of the gases to within one millimeter of mercury. When the contact 190 is broken, the control circuit releases the relay contacts, so that the valve 185 opens again. Thus the system acts to control the effective pressure at chamber 187.

A similar system is employed for the hydrogen supply, but it is not necessary to include the drying chamber 183 and the filter chamber 184.

The operation of the apparatus may be as follows:

In making sapphire or ruby rods for the preparation of jewel bearings, as an example of practice, the powder employed for making colorless sapphire is an essentially pure alumina. This can be prepared by purifying ammonium alum by recrystallization, followed by ignition at 950 degrees C. for several hours. The alumina, after ignition, is broken down by rod milling for one-fourth to one-half hour. The powder is preferably very light, having an apparent density of 0.20 to 0.25 grams per cubic centimeter.

The regulator valves 181 on the hydrogen and oxygen supply lines are set for a pressure of about 18 pounds per square inch. It will be noted that the provision of the drying chamber 183 on the oxygen line prevents the entry of moisture with the oxygen, thus preventing the possible action of such moisture in causing agglomeration and sticking of the powder to the sides of the funnel and tube.

The refractory support 125 may be of a suitable refractory material such as alundum or fire clay. A small portion of moist alundum cement is placed on its top and molded into the shape of the small cone with the vertex upward. The base 35 and the refractory support are adjusted for alignment with the axis of the torch, and the gas valves are opened and the torch flushed and lit. The refractory support is started in rotation at a speed of 50 to 300 R. P. M., say about 120 R. P. M., by energizing the motor 31, and is raised so that the alundum tip is brought into the flame and hardened at a red heat for a few minutes. Alternately a starting crystal may be placed upon the refractory support 125 and cemented in position with a predetermined orientation, as described hereinafter.

The side tapper 81 is started at a rate of about 250 vibrations per minute; its periodicity is not critical. The feeding tapper is then started, so that the can 54 is jarred by action upon the screens 52, 53 at a rate to cause growth at desired rate, such as one inch per hour.

The powder in the container 54 is thus agitated and each upward blow of the plunger 67 causes the discharge of a small but essentially constant quantity of the powder through the screens 52, 53 into the funnel 75, where it is prevented from "hanging" or adhering to the walls by the action of the side tapper 81 and by the downward current of oxygen entering from the primary oxygen supply pipe 85 under control of the valve 86. It will be noted that the funnel 75 has a small orifice 78, so that the increase in velocity and turbulence of the gas stream at this orifice assists in breaking up any larger masses of powder which may move into or be formed in the funnel 75.

A careful adjustment is now made, so that the rod is accurately positioned at the axis of the flame, and the flame is controlled (a length of 2½ to 3 inches has been found desirable for an oxyhydrogen flame, with the end of the rod being grown about one-half inch below the bottom of the hydrogen manifold plate 106, which was found to be the optimum position for crystallization with the particular apparatus) so that the upper surface becomes molten and its contour more rounded toward a hemisphere. During this initial stage, the particles of powder pass downward in the tube 77 with the primary oxygen current, and issue from the inner tip 92. The secondary oxygen current entering from pipe 85a flows downwardly between members 94 and 96 and around the inner nozzle 90 and forms a powder-free gas current which prevents contact of the powder with the outer torch walls.

The hydrogen entering through the holes 109 therefore passes through walls which are not contacted by the powder particles, but mixes with the oxygen and produces the flame F which passes downwardly (Fig. 9) toward the top of the rod R. The particles are fused in the heat of the flame and deposited upon the support which is positioned in their path.

When the concentricity has been assured, the temperature of the flame and the speed of rotation are reduced, and the photoelectric control unit is put in operation by closing connector 155c. If necessary, the position of the lens 142 and the screen 144 are adjusted, so that the image of the molten surface at the top end R of the rod just enters the hole in the screen and causes operation of the lowering motor 26. The clutch 131 is engaged and the system permitted to operate for 10 to 15 minutes. The rod grows upwardly from the starting crystal or alundum cone, and the support is lowered by the motor mechanism. Final adjustments for quality and diameter are then effected. Rods of 2 to 3 millimeters diameter and larger have been prepared with great uniformity. The normal rate of downward movement of the support, during the growing of the rod, is about one to two inches per unit hour with one existing and operating apparatus; and this is controlled by varying the rate of the feeding tapper. It has been found that the rod must be about one-fourth inch long before certain initial difficulties are corrected, such as the action of impurities from the starting cone, in causing bubbles by upward diffusion when the starting crystal is very small or is not employed. Likewise, the rod must be about one-eighth of an inch long as a minimum, to permit ready visual inspection for detecting small defects.

At this stage, the surface is examined under a lens and the final adjustments are made. With dark glasses, the incandescent powder stream should be faintly visible and show no evidence of large particles. The surface of the rod should appear molten, but there should be no visible evidence that the fused powder droplets are striking. Directly below the incandescent upper curved surface, there is a small relatively dark band which is clear alumina, and an examination of this band permits seeing into the rod to a considerable extent and determining the character of the rod being produced. Directly below the clear band, the rod appears frosted due to the deposit of alumina particles, from the liquid or vapor phase, constituting a minor surface defect which is easily removed afterward by polishing.

When the adjustments have been completed, the apparatus is permitted to run at a rate of growth of about one or two inches per hour. This rate can be changed by varying the potentiometer 166 which controls the frequency of the feeding tapper.

When the rod reaches the desired length, such as six to seven inches, the connectors 178 for the tappers are separated from their receptacles. The "manual control" switch 159 is closed. The field rheostat 157 is adjusted, so that the rod is now lowered at a rate of three inches per hour. At the end of ten minutes, this rheostat 157 is adjusted to a lowering rate of six inches per hour. When the upper end of the rod is about one and a half inches from the position in which it was grown, the torch is extinguished slowly, in a time of about ten minutes. This accelerated rod movement, with a slow extinction of the torch, provides for a slow cooling and permissive adjustment of internal strains; and it is well to permit the rod to cool below luminosity before removing it from the furnace. Also, the rods after removal from the support 125 may be given an additional subsequent annealing by heating slowly to 950 degrees C., holding for three hours, and allowing to cool in the annealing furnace.

The rod can be broken off, say, one-fourth of an inch above the support, and removed from the furnace. The stub end of the rod can then be raised into starting position as by operation of the reversing switch RS, and a new length of rod grown thereon.

In an apparatus which has been constructed, the screens 52, 53 are designed to support the weight of the can 54 and its contents and to pass a fine powder. For this purpose, the upper screen 52 was made of 60 mesh and the lower screen 53 of 325 mesh. The two screens cooperate in providing a stiff structure capable of delivering the fine powder under the desired conditions. The two screens are fixed and sealed at their edges to the can 54 and are mounted closely in contact; and the impact delivered from rod 51 appears to be distributed with essential uniformity over the effective area. In construction and adjustment, the entire can assembly 54 moves about one-eighth of an inch at each tapper blow. The inertia of the powder acts relatively downwardly, and the blow appears to act in breaking down particles larger than 325 mesh.

It has been pointed out above that a starting crystal can be employed to assist in the production of the rod. By mounting this starting crystal at a predetermined orientation of its crystal axes, it has been found that the growing rod tends to form at an orientation in which the axis is parallel to that in the starting rod. In this way rods may be produced which have the relative angle between their C or optic axis at any inclination to the rod axis from zero to 90 degrees. When sapphire rods are being formed, it is desirable for some purposes that the C axis should be inclined to the axis of the rod.

Further, it has been found that when a growing sapphire rod has a hexagonal cross-section above the starting alundum cone, and the flame and powder supply adjustments are varied, the diameter of the rod can be changed abruptly, but the hexagonal cross-section is still maintained, thus indicating that the individual sections of the rod essentially constitute a continuous single crystal of the same orientation, which has grown by the successive depositions. By increasing the flame, the diameter is increased: and therewith adjustment of the rate of powder supply permits growing the larger rod at essentially the same rate.

The length of the rod is determined by the size of the apparatus in establishing the distance through which the platform 40 may be lowered, and rods having very regular diameters of two or three millimeters have been grown to a length of six or seven inches with the existing apparatus as referred to above. The positive control by the successive deposition upon the rotating rod end and the regular growth of the crystal affords great stiffness to the rod so that it does not bend or curve, but continues to grow with essential uniformity of cross section about the axis of its rotation.

It has been found possible to make a sapphire or like rod in which the optic axis is at a predetermined orientation, and in which this orientation is maintained throughout the length of the rod. A starting crystal having its axes at the desired orientation, e. g., with the optic or C axis at the predetermined orientation to the axis of the rod, or to the vertical in the described apparatus, is positioned on the support and then the deposition is effected in the regular manner. When a section of a rod of proper orientation is not available as a starting crystal, then another rod having known angular directions of the crystal axis relative to the rod axis may be secured to the support in such a position that the selected relationship of the crystal axis exists relative to the vertical and growth is effected, as shown in Fig. 10.

The mechanical properties of the rods differ in accordance with the orientation of the crystal axis with respect to the rod axis. The optimum relative direction depends upon the purpose for which the material is to be used. The difference in properties is manifested in hardness, modulus of rupture, resistance to wear and impact, strength in tension, compression, torsion and shear, etc. As an example, if the C axis of the crystal be at 10 degrees or less relative to the rod axis, a rod of uniform cross-section may have a modulus of rupture of about 186,000 pounds per square inch. As the angle is increased above 10 degrees, this figure of value decreases and may become lower than 80,000 pounds per square inch. Therefore, when the rod is to be employed in making jewel pins, it is desirable to have a high modulus of rupture, which can be obtained by having essential coincidence of the C axis and the rod axis. Thus, in Figure 10, the starter crystal fragment 300 is illustrated as having its C axis in the direction of line 301. It is seated horizontally on the support 125, and the action of the particles in the flame F is to form the rod R with the C axis of the latter in the direction of the line 302.

As a further example, when an endstone or holestone is to be made for a jewel bearing in a watch or other instrument, it is preferred that the C axis be at an angle with respect to the rod axis; as under this condition a chipping or splitting of the rod is infrequent during cutting and drilling, and the rods may be cut much more quickly into the desired blanks for forming the bearing pieces. When the plane of the cut is perpendicular to the axis of the rod, such chipping and splitting is frequent if the relative angle is less than 25 degrees: but these defects decrease relatively rapidly until the angle is about 60 degrees. In some instances, it has been found that when the angle is in excess of 85 degrees with the sapphire, splitting and chipping are sometimes again prevalent, and it is therefore preferred to provide the rods with a relative angle of 50 to 70 degrees when endstones and holestones are to be made by cutting in radial planes of the axis of the rod.

While the operation has been described particularly with reference to the forming of a sapphire rod, other high-melting powdery crystallizable materials may be caused to deposit and form crystals in a like manner. In preparing rods and boules of ruby, etc., it is thus possible to prepare single crystals in which the axes are at any desired orientation for effecting cutting or further work, using a starting crystal with a predetermined orientation.

Spinel rods may similarly be grown by employing powder mixtures containing 2:1 to 2½:1 ratios of alumina and magnesia: if the ratio of alumina is increased, say to 5:1, then the rods are transparent in the flame, but are opaque when cool, possibly due to a phase separation. Spinels are isotropic; oriented-axis spinel crystals of octahedral crystal habit can be used for starting octahedral spinel rods in which the crystal axes are in predetermined relation to the rod axis.

It is obvious that the invention is not limited to the form of practice described in detail, but may be employed in many ways within the scope of the appended claims.

We claim:

1. An apparatus for forming rods of high-melting material, comprising a platform bearing a support upon which the rod is to be grown, means arranged to lower the platform, a blow-torch and means arranged to supply combustion gases thereto, said blowtorch being positioned above the support and arranged to deliver its flame downwardly toward the support, means arranged to supply powdery particles into the blowtorch whereby the blowtorch is effective to project a stream of melted particles toward the support, and photoelectric means responsive to the radiation from the growing end of the rod and constructed and arranged to control the rate of movement of said platform-lowering means.

2. An apparatus for forming rods of high-melting material, comprising a refractory support upon which the rod is grown, a structure including a blowtorch having a duct leading to a nozzle arranged for directing its flame downwardly, conduits connected for supplying combustion gases to the blowtorch, means arranged to supply the material as a powder into said blowtorch duct whereby the blowtorch is effective for delivering a stream of melted powder particles at high temperature downwardly toward the support, said structure being located above the support, radiation-responsive means constructed and arranged for receiving radiation from the growing end of the rod when the same is at less than a predetermined distance from said nozzle and effective to exclude radiation from the growing end when at a greater distance, and means arranged to lower said support and connected to said radiation-responsive means and controlled thereby so that the rate of downward movement of the support is coordinated with the rate of growth of the rod.

3. An apparatus for forming rods of high-melting material, comprising a refractory support upon which the rod is grown, a housing located above the refractory support and connected to a primary supply of combustion supporting gas, a powder container in said housing and means arranged to deliver repeated small quantities of powder downwardly therefrom, a duct arranged to convey the delivered powder in a stream of primary combustion-supporting gas from the housing, a sleeve surrounding said duct and connected to a secondary supply of combustion-supporting gas, said sleeve having a structure at its lower end arranged to provide a constricted outlet and chamber around said outlet and said duct terminating short of the constricted outlet in a jet orifice, and means arranged to supply combustible gas into the said chamber, said structure including orifices leading from said chamber to the constricted outlet for delivering the combustible gas into the combined combustion-supporting streams at said outlet, said constricted outlet being constructed and arranged to direct the flame of burning gases with the powder therein toward said refractory support.

4. An apparatus for forming a rod of refractory crystallizable material having the crystal axes at predetermined orientation to the axis of the rod, comprising a support having a monocrystalline mass of the material fixed thereto with the axes of the crystal disposed at angles to the vertical identical with the desired angles of the crystal axes to the rod axis, a blow torch mounted above the support and having a downwardly directed outlet from which the blow torch flame is projected toward said mass, means constructed and arranged for supplying the refractory material in powder form into the blow torch whereby the powder is fused in the flame and the fused particles delivered toward and onto said mass to effect growth of the rod thereon, means for scanning the position of the growing end of the rod, and means connected to and responsive to said scanning means and effective for moving the support downwardly for withdrawing the rod away from the blow torch in proportion as fused particles are deposited at the upper end thereof whereby a portion of the rod withdrawn from a hotter part of the flame is subjected to relative cooling in a cooler part of the flame.

5. An apparatus for forming bodies of high-melting crystallizable material, comprising a refractory support upon which the body is grown, a housing mounted above the said support, a powder container in said housing and having a screen at its bottom, means arranged for giving the container and screen intermittent upward impulses whereby to provoke a discharge of powder from the container through the screen into the housing space below the container and then permitting the same to drop between the impulses, a funnel located in the housing beneath the screen to collect the discharged powder, a duct extending downward from the housing for conveying the powder and having at its own lower end an opening above the said support, resilient means arranged to support the upper end of the duct in communication with the lower end of the funnel, a second rapping means arranged for intermittently shaking the duct and funnel, a second duct, and means arranged for supplying combustion-supporting gas to said ducts, said second duct being arranged around the lower end of the said powder duct and positioned and arranged to provide a blow torch chamber in which combustion-supporting and combustible gases are mixed and to direct the combustion flame therefrom toward the refractory support whereby the powder is melted in the flame and delivered upon the growing body, and means to supply combustible gas into said chamber.

6. An apparatus for forming bodies of high-melting material, comprising a base having a standard and a column thereon, a refractory support mounted thereon for upward and downward movement and upon which the body is to be grown, a housing rigidly mounted on the column above the support, a powder container in the housing and having a screen at its bottom, a member connected to the screen and extending upwardly therefrom, a solenoid mounted above the screen, a plunger actuated upwardly by the solenoid when energized, said member including a part located in the path of upward movement of the plunger whereby the screen is given an upward impulse when the plunger is energized, a stop mounted on the column and arranged to limit the downward movement of the member when the solenoid is deenergized, said impulse being effective to cause the screen to discharge a quantity of powder downwardly into the housing space there-beneath, a duct arranged for receiving the quantity of powder and conveying the same downwardly, a second duct, and means arranged for supplying combustion-supporting gas to said ducts, said second duct being arranged around the lower end of the said powder duct and positioned and arranged to provide a blow torch chamber in which combustion-supporting and combustible gases are mixed and to direct the combustion flame toward the refractory support whereby the powder is melted in the flame and delivered upon the growing body, and means to supply combustible gas into said chamber.

7. An apparatus for forming rods of high-melting material, comprising a refractory support upon which the rod is grown, a blow torch located above the support and having a downwardly directed outlet, a powder container located above the blow torch and having a screen at its bottom, a rapping device arranged for imparting upward impulses to the screen whereby to cause powder to pass therethrough, a duct arranged for receiving the powder from the screen and to deliver the same into the blow torch whereby the powder is fused in the blow torch flame, said torch being arranged and positioned to deliver its flame with the molten particles therein toward the support, means constructed and arranged to energize the said rapping device, a second device constructed and arranged to shake the duct, and means arranged to energize the second device.

8. An apparatus for forming rods of high-melting material, comprising a refractory support upon which the rod is grown, a housing located above the refractory support and connected to a primary supply of combustion-supporting gas, a powder container in said housing and means arranged to deliver repeated small quantities of powder downwardly therefrom, a duct arranged to convey the delivered powder from the housing in a stream of primary combustion-supporting gas, means arranged to rap the duct intermittently, a sleeve surrounding said duct and connected to a secondary supply of combustion-supporting gas, said sleeve having a structure at its lower end arranged to provide a constricted outlet and chamber around said outlet and said duct terminating short of the constricted outlet in a jet orifice, and means arranged to supply combustible gas into the said chamber, said structure including orifices leading from said chamber to the constricted outlet for delivering the combustible gas into the combined combustion-supporting streams at said outlet, said constricted outlet being constructed and arranged to direct the flame of burning gases with the powder therein toward said refractory support.

RAYMOND HOLMES LESTER.
MELVIN CROXALL CANNON.
FRANK CREIGHTON ALEXANDER, Jr.

REFERENCES CITED

The following references are of record in the file of this patent:

UNITED STATES PATENTS

| Number | Name | Date |
|---|---|---|
| Re. 19,697 | Kjellgren | Sept. 10, 1935 |
| 988,230 | Verneuil | Mar. 28, 1911 |
| 1,298,540 | Miller | Mar. 25, 1919 |
| 1,605,073 | Ruff | Nov. 2, 1926 |
| 1,793,672 | Bridgman | Feb. 24, 1931 |
| 1,959,654 | Berg | May 22, 1934 |
| 2,006,342 | Booge | July 2, 1935 |
| 2,214,976 | Stockbarger | Sept. 17, 1940 |
| 2,382,187 | Vang | Aug. 14, 1945 |

FOREIGN PATENTS

| Number | Country | Date |
|---|---|---|
| 361,413 | France | Apr. 25, 1906 |
| 284,258 | Germany | May 14, 1915 |
| 390,795 | Germany | Feb. 23, 1924 |
| 429,170 | Germany | May 20, 1924 |
| 243,251 | Great Britain | Nov. 26, 1925 |
| 662,782 | France | Mar. 25, 1929 |
| 509,132 | Germany | Oct. 4, 1930 |
| 158,179 | Switzerland | Nov. 15, 1932 |